United States Patent
Wilkes et al.

[11] Patent Number: 5,905,098
[45] Date of Patent: May 18, 1999

[54] PROCESS FOR PRODUCING LOW DENSITY POLETHYLENIC FOAM WITH ATMOSPHERIC GASES AND POLYGLYOLS OR POLYGYCOL EHTERS

[75] Inventors: Gary R. Wilkes, Saratoga Springs, N.Y.; Harris A. Dunbar, Corinth, N.Y.; Kim A. Bly, Queensbury, N.Y.; Eugene R. Uhl, Russell, Ky.

[73] Assignee: Tenneco Protective Packaging, Inc., Glens Falls, N.Y.

[21] Appl. No.: 09/184,601

[22] Filed: Nov. 2, 1998

Related U.S. Application Data

[62] Division of application No. 08/828,500, Mar. 31, 1997, Pat. No. 5,849,226, which is a continuation of application No. 08/694,298, Aug. 8, 1996, Pat. No. 5,698,144.

[51] Int. Cl.[6] .................. C08J 9/08; C08J 9/12; B29J 44/20
[52] U.S. Cl. .................. 521/88; 264/50; 264/51; 264/DIG. 5; 521/82; 521/91; 521/92; 521/97; 521/142; 521/143; 521/79
[58] Field of Search ................... 521/88, 82, 91, 521/92, 97, 142, 143, 79; 264/50, 51

[56] References Cited

U.S. PATENT DOCUMENTS

| | | | |
|---|---|---|---|
| 4,196,267 | 4/1980 | Watanabe et al. | 264/53 |
| 4,214,054 | 7/1980 | Watanabe et al. | 521/95 |
| 4,217,319 | 8/1980 | Komori | 264/53 |
| 4,323,528 | 4/1982 | Collins | 264/53 |
| 4,421,535 | 12/1983 | Mehra | 62/17 |
| 4,456,704 | 6/1984 | Fukumura et al. | 264/53 |
| 4,569,950 | 2/1986 | Hoshi et al. | 264/54 |
| 4,695,672 | 9/1987 | Bunting | 585/867 |
| 5,059,376 | 10/1991 | Pontiff et al. | 264/234 |
| 5,116,881 | 5/1992 | Park et al. | 521/143 |
| 5,225,451 | 7/1993 | Rogers et al. | 521/94 |
| 5,229,429 | 7/1993 | Hahn et al. | 521/87 |
| 5,290,822 | 3/1994 | Rogers et al. | 521/94 |
| 5,416,129 | 5/1995 | Chaudhary et al. | 521/79 |
| 5,554,661 | 9/1996 | Chaudhary et al. | |
| 5,556,920 | 9/1996 | Tanaka et al. | 525/216 |
| 5,621,046 | 4/1997 | Iwanami et al. | 525/240 |
| 5,680,720 | 10/1997 | Asazuma et al. | 40/564 |
| 5,698,144 | 12/1997 | Wilkes et al. | 264/50 |
| 5,702,657 | 12/1997 | Yoshida et al. | 264/112 |

OTHER PUBLICATIONS

Kirk Othmer Encyclopedia of Chemical Technology, Third Ed., vol. 16, pp. 385 and 420 (undated).
Modern Plastics Encyclopedia, pp. 52–63 (1986–87).
Encyclopedia of Polymer Science and Technology, vol. 7, p. 610 (undated).

*Primary Examiner*—Morton Foelak
*Attorney, Agent, or Firm*—Arnold White & Durkee

[57] ABSTRACT

Members either of the polyglycol family of substances, more generally, or of the polyglycol ether subset of polyether compounds, more particularly, both for their gas absorption properties and for their plasticizing effect in a polyethylenic extrudate, are combined with physical atmospheric blowing agents, such as, nitrogen, argon, carbon dioxide, water, and blends thereof, to produce uncrosslinked polyethylenic foams having densities as low as 10 kg/m$^3$.

1 Claim, No Drawings

PROCESS FOR PRODUCING LOW DENSITY POLETHYLENIC FOAM WITH ATMOSPHERIC GASES AND POLYGLYOLS OR POLYGYCOL EHTERS

This application is a divisional of U.S. application Ser. No. 08/828,500, filed Mar. 31, 1997, now U.S. Pat. No. 5,849,226, which is a continuation of U.S. application Ser. No. 08/694,298, filed Aug. 8, 1996, and issued as U.S. Pat. No. 5,698,144 on Dec. 16, 1997.

BACKGROUND OF THE INVENTION

1. Field of the Invention

The invention relates to a process for producing low density polyethylenic foam.

2. Background Art

Low-density thermoplastic foams, particularly those having a density of less than about 150 kg/m$^3$, generally are produced with physical blowing agents. Physical blowing agents are those chemical compounds which can be incorporated into the thermoplastic melt while within the extruders at high pressures, typically at 10 to 20 MPa, and which can be contained by the polymer structure when the cooled thermoplastic/blowing agent mixture is rapidly reduced to ambient atmospheric pressure. Polyethylenic foams, in particular uncrosslinked polyethylene foam, were manufactured for many years with halogenated hydrocarbons, primarily chlorofluorocarbons (CFC's), as physical blowing agents.

During the 1980's, the worldwide scientific community presented sufficient evidence linking CFC's with atmospheric ozone depletion and sought for governments to regulate CFC's. Ozone levels in the stratosphere have been shown to be significant in protecting life on the planet from the damaging effects of ultraviolet radiation from the sun. Additionally, hydrochlorofluorocarbons (HCFC's), another class of chemical compounds, were also included in the resultant adopted regulations, but on a more lengthy schedule. The scientific community also showed that it was the higher atomic weight halogen compounds other than fluorine, which were the culprits.

As a result of the regulations, many low-density foam manufacturers sought to find materials other than halogenated compounds which could function as physical blowing agents. Many different approaches were taken, but generally these approaches involved the use either of hydrocarbons containing from two to five carbons or of blends thereof. Such short-chained hydrocarbons generally function as physical blowing agents to produce foams with satisfactory to physical properties, but they do have the adverse effect of flammability. U.S. Pat. No. 4,217,319 (Komori) discloses a process for producing polyethylene foams with various volatile organic compounds as the physical blowing agent. U.S. Patent Nos. 5,290,822 and 5,225,451 (Rogers et al.) disclose processes for producing ultra-low density foams using polymer blends. U.S. Pat. No. 5,059,376 (Pontiff) discloses a process to remove residual hydrocarbons, the purpose of which is to produce a non-flammable polyethylene foam.

U.S. Pat. No. 4,323,528 (Collins) discloses a method and an apparatus for manufacturing a large size, low density foam sheet of thickness in excess of 25 mm without restriction of the physical blowing agent. The intermittent process disclosed in the Collins patent provides an alternative embodiment for the current disclosure.

Patents for several processes involving the use of atmospheric gases to produce polyethylene foam have been issued in the 1990's. For example, U.S. Pat. No. 5,416,129 (Chaudhary et al.) discloses a process for preparing uncrosslinked ethylenic polymer foam using a polymer of a defined melt tension with an inorganic halogen-free blowing agent, such as, argon, carbon dioxide, or blends thereof. This disclosure indicates that argon and carbon dioxide in blends can function as a physical blowing agent with ethylenic materials having a specific melt tension. However, the associated reported data therein also suggest difficulty in maintaining satisfactory long term foam quality.

Patented processes for the purification of hydrocarbon effluent gases have utilized the enhanced solubility of acid gases in certain polyethers such as in tetraethylene glycol dimethyl ether. U.S. Pat. No. 4,421,535 (Mehra) and U.S. Pat. No. 4,695,672 (Bunting) describe processes which utilize physical solvents such as tetraethylene glycol dimethyl ether to remove acid gases such as carbon dioxide from hydrocarbon gas streams. These disclosures demonstrate the high affinity of the ether chemical bond for certain gases.

BROAD DESCRIPTION OF THE INVENTION

An object of the invention is to provide means by which a simple, low cost and reliable technique can be used to produce a low-density uncrosslinked polyethylenic foam which does not contain any chemical compounds which have been shown to exhibit adverse effects on the stratospheric ozone concentration.

Another object of the invention is to provide a means by which a simple, low cost and reliable technique can be used to produce a low-density uncrosslinked polyethylenic foam which does not contain flammable levels of hydrocarbon compounds. An additional object of the invention is to incorporate only chemical compounds which do not adversely affect human, animal, or plant life, so that the invention process can be used without sophisticated protection devices or elaborate control technology. It is, thus, an additional object of the invention to utilize only physical blowing agents which are chemical compounds which naturally occur in the atmosphere. A further object of the invention is to produce a stable polyethylenic foam structure, the physical properties of which will not significantly deteriorate over the course of time. An additional object of the invention is to produce a polyethylenic foam material which will not adversely affect the surface characteristics of other materials with which the foam may be placed in intimate contact. Other objects and advantages of the invention are set out herein or are obvious herefrom to one skilled in the art.

The objects and advantages of the invention are achieved by the process of the invention.

The invention involves, in general, a process for manufacturing a foamed thermoplastic polyethylenic material. More specifically, the invention involves a process for producing low-density, uncrosslinked polyethylenic foams from atmospheric gases, using a polyglycol or a polyglycol ether as a compatibilizing agent. The adsorption properties of such compatibilizing agents are useful in reducing the permeation rate of atmospheric gases from the thermoplastic polyethylenic foam structure.

In accordance with the aforementioned objects, the invention incorporates chemical compounds having structures including multiple ether bonds which will absorb sufficiently high levels of atmospheric gases, such as, nitrogen, argon, or carbon dioxide, within the extrudate, to control and limit the subsequent foaming rate at the extrusion die. Also, in accordance with the objects of the invention, the invention utilizes chemical compounds having structures including multiple ether bonds which will sufficiently plasticize the thermoplastic polyethylenic extrudate and maintain sufficiently low die melt temperatures, to produce a closed cell foam structure.

In traditional polyethylenic foam extrusion processes, pellets of the thermoplastic polyethylenic resin are blended with a solid phase nucleating agent and, then, are melted in a heated extruder where the plastic and nucleating agent combination is held at both a high temperature and a high pressure. The physical blowing agent(s), which generally liquefies within the extruder, and which will vaporize at die melt temperatures and atmospheric pressure, is added to the pressurized melted material. Within the molten extrudate, the blowing agent(s) tends to act as a plasticizer to reduce the viscosity of the extrudate, and, thus, it lowers the level of temperature necessary to maintain the hot melt condition of the mixture of thermoplastic polyethylenic material and nucleating agent. The blowing agent(s) is mixed with the melted polyethylenic plastic and nucleating agent, and the combination is, subsequently, cooled to an extrusion temperature suitable for foaming. To prevent the collapse of the resulting foam structure over time, a permeation modifier agent, which is usually an ester of a fatty acid having a chain of 16 to 22 carbon atoms, is often also added. The cooled combination is pushed through a die by the pressure gradient, and, when released to atmospheric pressure, the liquefied physical blowing agent(s) vaporizes and expands to form bubbles of gas at the nucleating sites established by the uniformly dispersed nucleating agent particles. One particular example utilizes low-density polyethylene as the plastic, isobutane as the blowing agent, crystalline silica as the nucleating agent, and glyceryl monostearate as the permeation modifier.

Chemical compounds with ether bonding tend to be good to excellent solvents for most uncrosslinked thermoplastic polyethylenic resins at normal or slightly elevated temperatures. Most of these same ether compounds also have a high solubility for compounds with polar molecules like water or carbon dioxide. Gases like nitrogen and argon also have appreciable solubility in some ether compounds at elevated temperatures. Small molecule ethers are extremely flammable in air, but the flammability of each particular member of the ether family of substances decreases significantly as the molecular weight of the ether increases. Polyethers with molecular weights as low as 200 to 275 tend both to be liquids at ambient temperature and to boil at temperatures in excess of 200° C. and are, thus, not flammable, although they are combustible. Polyethers with molecular weights above about 1000 tend both to be solid at ambient temperatures and to boil above 200° C. They also are not flammable.

Naturally occurring atmospheric gases, such as, carbon dioxide, nitrogen, argon, and water, normally tend to produce poor quality thermoplastic foams. This is because such gases have limited solubility within the molten thermoplastic polyethylenic extrudate and, thus, produce a high level of open cells in the foam structure as the thermoplastic/blowing agent combination exits the die. Additionally, even if the resultant thermoplastic polyethylenic foams made with atmospheric gases have a visible foam structure, many of such foams tend to collapse quickly in time, becoming useless for most practical applications in less than 24 hours after production. The incorporation of select polyether compounds, particularly both those which are larger polymers of ethylene glycol and may be classified as polyglycols and those which are monoethers or diethers of these polyglycols and may be classified as polyglycol ethers, function to compatibilize the thermoplastic/physical blowing agent blend due to solubility properties for both the polyethylenic resin and the physical blowing agents. The result is a significantly reduced gas expansion rate at the die for naturally occurring atmospheric gases, which allows for the production of good closed-cell foam quality. The presence of either the polyglycols or the polyglycol ethers in the resultant foam structure also reduces the diffusion rate of these gases from the foam into the atmosphere and, thus, either eliminates or significantly reduces the rate of collapse normally exhibited by polyethylenic foam made with atmospheric gases.

When atmospheric gases are used in the polyethylenic foam extrusion process of the invention, pellets of the thermoplastic polyethylenic resin are mixed with a solid phase nucleating agent and, then, are melted in a heated extruder. As is the case in the traditional foam process, the plastic and nucleating agent in the heated extruder are held under high temperature and pressure. The atmospheric gas or atmospheric gas blend which serves as the physical blowing agent is still added at the typical extruder injection zone of the extrusion device. Additionally, a liquid or liquefied solid polyglycol or polyglycol ether is added in the same extrusion zone, either through the same injection port or, preferably, through a separate injection port located at some angle (generally 90° or 180°) radially from the physical blowing agent injection port. Within the molten extrudate, the blowing agent and either polyglycol or polyglycol ether both tend to act as plasticizers to reduce the viscosity and, thus, lower the level of temperature necessary to maintain the hot melt condition of the mixture of thermoplastic polyethylenic material and nucleating agent. The physical blowing agent and either polyglycol or polyglycol ether blend are mixed with the melted polyethylenic material and nucleating agent, and, subsequently, the combination is cooled to an extrusion temperature suitable for foaming. Then, the cooled combination is pushed through a die by the pressure gradient and, when it is released to atmospheric pressure, the physical blowing agent expands rapidly but at a less rapid rate than would occur if the compatibilizing agent was not present. In the ambient atmosphere, at ambient temperatures, the thermoplastic/compatibilizer/physical blowing agent blend expands to form bubbles of the physical blowing agent gas at the nucleating sites established by the uniformly dispersed nucleating agent particles. The affinity of the either polyglycol or polyglycol ether for the gas also tends to slow the diffusion rate of the gas molecules from the foam structure so that the polyethylenic foam does not collapse in 24 hours or less as it would if the either polyglycol or polyglycol ether was not present. The use of the fatty acid ester permeation modifier is generally not required.

Broadly, the invention involves a process for making an uncrosslinked closed-cell low density polyethylenic resin foam having a density of 10 kg/m$^3$ to 150 kg/m$^3$, comprising:

(a) heating an uncrosslinked low density polyethylenic resin to form a polyethylenic resin melt;

(b) incorporating an effective amount of at least one pressurized inorganic halogen-free blowing agent into the polyethylenic resin melt to form a foamable composition;

(c) incorporating an effective amount of a melt of a polyglycol or a polyglycol ether into the foamable composition;

(d) cooling the foamable composition to a temperature effective for the expansion of a low density polyethylenic resin foam; and (e) extruding or ejecting the foamable composition through a die to form the low density polyethylenic resin foam.

DETAILED DESCRIPTION OF THE DISCLOSURE

The polyethylenic resins used in the invention process can be those obtained by polymerizing ethylene, or polymerizing ethylene with other aliphatic monoolefins, such as, propylene, 1-butene, 1-pentene, 3-methyl-1butene, 4-methyl-1-pentene, 4-methyl-1-hexene, or 5-methyl-1-hexene alone or mixtures thereof, or with various other polymerizable compounds.

The polyethylenic resins useful in the invention process include homopolymers of ethylene and copolymers of ethylene and other ethylenically-unsaturated monomers having from 3 to about 8 carbon atoms, such as, propylene, butenes, pentenes, hexenes and the like. These comonomers preferably have from 3 to about 6 carbon atoms, and, most preferably, have 3 or 4 carbon atoms. The copolymers can include other monomers compatible with ethylene. Particularly preferred are medium density polyethylene, low density polyethylene, and linear low density polyethylene. Such polyethylenes are described in the *Kirk Othmer Encyclopedia of Chemical Technology,* Third Ed., Vol. 16, pages 385, 420, the *Modern Plastics Encyclopedia,* (1986–87), pages 52–63, and the *Encyclopedia of Polymer Science and Technology,* Vol. 7, page 610, which are incorporated herein by reference.

The term "polyethylenic resin (or material)", as used herein, is meant to include not only homopolymers of ethylene, but also ethylene copolymers composed both of at least 50 mole percent (preferably at least 70 mole percent) of an ethylene unit and a minor proportion of a monomer copolymerizable with ethylene, and blends of at least 50 percent by weight (preferably at least 60 percent by weight) of the ethylene homopolymer or copolymer with another compatible polymer.

Examples of monomers which are copolymerizable with ethylene are vinyl acetate, vinyl chloride, propylene, butene, hexene, acrylic acid and its esters, and methacrylic acid and its esters. The ethylene homopolymer or copolymer can be blended with any polymer compatible with it. Examples of such compatible polymers include polypropylene, polybutadiene, polyisoprene, polychloroprene, chlorinated polyethylene, polyvinyl chloride, styrene/butadiene copolymer, vinyl acetate/ethylene copolymer, acrylonitrile/butadiene copolymer and vinyl chloride/vinyl acetate copolymer. Preferred examples of such compatible polymers are polypropylene, polybutadiene and styrene/butadiene copolymer.

Examples of polyethylenic resins which can be advantageously employed in the invention are low-, medium- and high-density polyethylenes, ethylene/vinyl acetate copolymer, ethylene/propylene copolymer, copolymers of ethylene and methyl or ethyl acrylate, blends of polyethylene and polypropylene, blends of polyethylene and ethylene/vinyl acetate copolymer, and blends of polyethylene and ethylene/propylene copolymer. Of these, the medium density polyethylenes, low density polyethylenes, and ethylene/propylene copolymers are especially suitable.

The preferred polyethylenes are uncrosslinked, low density polyethylene having a density in the range of 910 to 920 kg/m$^3$ and a melt flow index in the range of 1.8 to 2.2 g per 10 minutes. In general, the ethylenic polymers should have a melt (flow) index of less than about 25 grams per 10 minutes.

The melt (flow) index (ASTM D1238) for polyethylene is the nominal flow rate at 190° C. and 689.5 KPa, and is expressed as grams per 10 minutes.

The polyethylenes used in the invention process are uncrosslinked.

The nucleating agent (cell size control agent) can be any conventional or useful nucleating agent(s). The cell size agent is preferably used in an amount of 0.5 to 2.0 weight percent, depending upon the desired cell size, based upon the weight of the polyethylenic resin. Examples of the cell size control agents are inorganic cell size-controlling agents (in very small particulate form), such as, clay, talc, silica, and organic cell size-controlling agents which decompose or react at the heating temperature within the extruder to evolve gases such as a combination of an alkali metal salt of a polycarboxylic acid, such as, sodium hydrogen tartrate, potassium hydrogen succinate, sodium citrate, potassium citrate or sodium oxalate (or a polycarboxylic acid such as citric acid) with a carbonate or bicarbonate, such as, sodium bicarbonate, sodium carbonate, potassium bicarbonate, potassium carbonate or calcium carbonate. A combination of a monoalkali metal salt of a polycarboxylic acid, such as, monosodium citrate or monosodium tartrate, with a carbonate or bicarbonate is an example. Preferred cell size control agents are talc or a stochiometric mixture of citric acid and sodium bicarbonate (the mixture having a 1 to 100 percent concentration where the carrier is the base resin). The most preferred cell size control agent is crystalline silica. Mixtures of cell size control agents can be used.

The blowing agent(s) are inorganic halogen-free blowing agents which are environmentally acceptable and inflammable. The preferred blowing agents are the inert inorganic atmospheric gases, such as, argon, carbon dioxide, water, nitrogen, neon, helium and krypton (but not, for example, oxygen, ozone, sulfur dioxide, methane or nitrous oxide). The most preferred blowing agents are argon, carbon dioxide and mixtures (blends) thereof. A good blend of the blowing agents is carbon dioxide and nitrogen. When two blowing agents are used, they can be individually injected into separate injection ports or they can be injected together into the same injection port in the mixing extruder. The argon blowing agent usually is used at a rate of 0.1 to 4 weight percent, preferably 0.1 to 2.0 weight percent, of the total extruder flow rate. The carbon dioxide blowing agent usually is used at a rate of 0.5 to 7.0 weight percent, preferably 0.5 to 5.0 weight percent, of the total extruder flow rate. The nitrogen blowing agent usually is used at a rate of 0.1 to 2 weight percent of the total extruder flow rate.

The compatibilizing agent can be a polyglycol, a polyglycol ether or a mixture thereof. The preferred amount of the compatibilizing agent used is 0.1 to 3.0 weight percent of the total extruder flow rate. The polyglycol preferably is a polyethylene glycol. The polyethylene glycol usually has an average molecular weight of 200 to 15,000, preferably 200 to about 8,000, and most preferably about 8,000. The polyethylene glycol can have an average molecular weight as high as 20,000 to about 25,000. Polyethylene glycol is more effective when the blowing agent is carbon dioxide than when the blowing agent is argon. Preferably, the polyglycol ether is an alkyl ether of a polyalkylene glycol, for example, of a polyethylene glycol or a polypropylene glycol. The preferred polyglycol ethers are tetraethylene glycol dimethyl ether, tripropylene glycol dimethyl ether, diethylene glycol dibutyl ether and poly(ethylene glycol) dimethyl ether, these ethers are preferred examples of the preferred class of dialkyl ethers of polyalkylene glycols. A suitable range of molecular weight for dimethyl ether of polyethylene glycol containing 3 to 10 ethylene units is 146 to 476. Mixtures of the polyglycol ethers, either by themselves or with polyglycol, can be used. Polyethylene glycols are generally linear and the polyethylene glycol ethers are preferably linear.

The permeation modifier (or stability control agent), when used, is generally used in the amount of 0.1 to 10 parts by weight (best 0.5 to 5 parts by weight) per 100 parts of the polyethylenic resin. When used, the permeation modifiers are present in amounts effective to adjust the permeability of the polyethylenic polymer foam cell walls to the blowing agent(s) used, relative to air or other ambient atmosphere, so as to help produce the desired rate and degree of purging of the blowing agent(s). Any useful permeation modifiers can be used.

The permeation modifier can be an ester of a long-chain fatty acid and a polyhydric alcohol. Generally, such esters are the esters of a fatty acid having from 8 to 20 carbon atoms and a polyhydric alcohol having from 3 to 6 hydroxyl groups. Examples of such esters are glycerol monolaurate, glycerol dilaurate, glycerol trilaurate, glycerol monopalmitate, glycerol dipalmitate, glycerol tripalmitate, glycerol monostearate, glycerol distearate, glycerol tristearate, glycerol monooleate, glycerol dioleate, glycerol trioleate, glycerol monocaprylate, glycerol dicaprylate, glycerol tricaprylate, sorbitan monopalmitate, sorbitan monolaurate, sorbitan monostearate and sorbitan monooleate, and a mixture of at least two of such esters. The preferred permeation modifiers are glycerol monostearate and glycerol monooleate.

The partial esters of long-chain fatty acids and polyhydric alcohols are described in U.S. Pat. No. 3,644,230, the pertinent portions of which are incorporated herein by reference.

The permeation modifier can be a saturated higher fatty acid amide, a saturated higher aliphatic amine or a complete ester of a saturated higher fatty acid disclosed in U.S. Pat. Nos. 4,217,319 and 4,214,054, the pertinent portions of which are incorporated herein by reference.

Other additives, such as, coloring agents, fire retardants, antioxidants and plasticizers, can be used.

The process can be operated on a continuous basis using a conventional extruder system.

The process can also be operated on an intermittent basis to produce large or thick polyethylenic foam (e.g., planks) using an extruder-accumulator system such as that which is disclosed in U.S. Pat. No. 4,323,528, the pertinent parts of which are incorporated herein. First, a foamable mixture is prepared in the mixing zone of an extruder. The foamable mixture cooled to a temperature, for example, in the preferable range of about 210° F., is introduced into the holding zone of an accumulator. The holding zone is maintained both at a temperature (e.g., 180° F. to 240° F.) and at a pressure (e.g., 400 psig to 1,500 psig) which do not allow the foamable mixture to foam. The holding zone is formed with an outlet die having an orifice which opens into a zone of lower pressure, such as, the atmosphere. The die orifice is preferably externally closable by a gate which is movable externally of the holding zone to open and close the die orifice. The movement of the gate does not, in any way, disturb or otherwise physically affect the foamable mixture within the holding zone other than to release it to the atmosphere when opened.

The ejection rate, i.e., the time necessary to empty the holding chamber of the accumulator can be varied widely. Ejection rates of about 5,000 to about 18,000 pounds per hour (pph), preferably about 8,000 pph to about 12,000 pph, can be used. Ejection rates are dependent on many factors, such as, the type of thermoplastic polyethylenic polymer being employed, the blowing agent and amount thereof employed, the amount of nucleation, i.e., nucleating agents employed, the presence or absence of other extrusion aiding additives, the temperature of the molten foamable mixture, the pressure under which it is stored in the holding chamber, the force and speed with which the ram is moved, and the size and configuration of the die orifice. The optimum rate of ejection to produce the desired cellular body having the desired characteristics and size can be readily arrived at for any particular composition of molten foamable mixture and any particular equipment by making a few adjustment runs.

The molten foamable mixture begins to expand as soon as it leaves the die orifice of the accumulator and enters the zone of lower pressure, e.g., the atmosphere. The cellular body preferably is supported by means of a conveyor system of some type, e.g., conveyor belt, or conveyor rollers, from the time that ejection is begun until ejection is terminated. The ejected foaming molten mixture continues to expand throughout the entire ejection operation which normally takes from less than one second to several seconds and continues to expand even after the ejection operation has been completed. The expansion of the cellular body continues for a few to several minutes after ejection is completed, indicating that the body is still deformable. When it is in an expanding or deformable condition, it can be further shaped, for example, by transfer molding or simply by altering one or more or all surfaces of the expanding cellular body. After a period of time, the cellular body ceases to expand any further which indicates that cooling has taken place to the extent that the body is no longer totally deformable.

The low density polyethylenic foams produced by the invention process have sufficient melt strength to prevent cell collapse during the foam expansion.

The thermoplastic polyethylenic cellular bodies produced by this invention are of low density. The polyethylenic cellular bodies produced by the invention process are of substantially consistent cross-section throughout their lengths. The lengths of such bodies can be varied as desired from a few feet such as 2, 3 or 4 up to many feet, such as 12, 24, 48 or more feet depending upon the size and capacity of the equipment used especially the size of the die opening and the capacity of the holding chamber. In addition, the polyethylenic cellular bodies produced by this invention have a closed cellular structure covered with a thin membrane and have substantially uniform ultra low densities, cell size, K-factor and resiliency along the length of the body when such bodies are ejected and are allowed to expand freely. Furthermore, the polyethylenic cellular bodies of this invention are capable of being produced with consistently uniform properties such as are described above from run to run in commercial production equipment.

The polyethylenic cellular bodies provided by the invention are light in weight and are useful as cushioning materials in packaging delicate goods such as computers, glassware, electronic equipment, such as, TV sets, receivers, VCRs and the like, furniture, and any article that needs to be protected from shock, gouging or surface-scratching or marring.

The invention process has utility both as a continuous process embodiment and as an intermittent process embodiments. The continuous process for polyethylenic foams (e.g., planks) can produce foam of any thickness. The intermittent process is generally used for large cross-section polyethylenic foams having thicknesses greater than about 25 mm. The extrusion conditions of the continuous process and the ejection conditions of the intermittent process are similar, but they do differ slightly in preferred compositions. Thus, there are actually two preferred embodiments of the invention.

DESCRIPTION OF THE TWO PREFERRED EMBODIMENTS

CONTINUOUS PROCESS

Pellets of low-density polyethylene resin which have a density in the range of 910 to 920 kg/m$^3$ and a melt flow index in the range of 1.8 to 2.2 g/10 minutes (ASTM Condition P) are co-fed into an extruder hopper with 5 to 6 weight percent pellets of a concentrate having 20 percent active of crystalline silica (active means percentage). This concentrate is also based in a low-density polyethylenic material which has a melt flow index which is preferably in the same range as is the resin of the polyethylene pellets. The pellet blend is melted in a 48:1 L:D single screw extruder, and is compressed by the screw to a pressure of about 1.25 MPa. The screw is mechanically driven to rotate at a rate of 30 to 50 revolutions per minute, depending upon the desired extruder output rate. Through one injection port (which is located approximately 16 diameter lengths downstream of the extruder pellet feed throat), carbon dioxide which has been pressurized to 1.75 MPa is regulated through a control valve, for delivery at about 5 to 6 percent of the total extruder flow rate. Through a separate injection port (which is located 180° radially from the port used for carbon dioxide), liquefied polyethylene glycol with an average molecular weight of 8000 (PEG 8000) and which has been heated to a temperature of at least 65° C. is pumped into a pressure of about 1.7 MPa and, subsequently, is regulated into the extruder at a rate of about 1.5 percent of the total extruder flow rate.

Immediately downstream from the injection port, the extruder screw is equipped with a mixing section containing at least four screw-diameter lengths of multiple, highly-pitched, segmented flights. The physical blowing agent(s) and the PEG 8000 are mixed in the pressurized melted material in the mixing zone.

To deliver an extrusion melt temperature in the range of 105° to 115° C. to the head of the extruder at a pressure of 9.3 to 10.0 MPa if an optional gear pump is present, or at a pressure of 15 to 17 MPa if there is no gear pump, the barrel temperatures of the four or more extruder zones of the single screw extruder subsequent to the injection zone are decreased in increments.

The pressurized melt is delivered to an annular foam die with an exit angle of 40 to 50° and to die lands with a converging angle of 3° to 5°. The cooled polyethylene/carbon dioxide/PEG 8000 combination extrudes through the die to atmospheric pressure, and most of the physical blowing agent expands rapidly to form bubbles at the nucleating sites established by the nucleating agent particles.

Example 1 details the preferred embodiment of the invention for the continuous process. Example 2 details an alternative embodiment which uses tetraethylene glycol dimethyl ether. Example 3 shows the results which occur when water is added to the combination of Example 2. Example 4 shows the results which occur when the tetraethylene glycol dimethyl ether is removed from the process under the conditions of Example 2.

INTERMITTENT PROCESS FOR LARGE CROSS-SECTION FOAM

Pellets of low-density polyethylene resin which have a density in the range of 910 to 920 kg/m$^3$ and a melt flow index in the range of 1.8 to 2.2 g/10 minutes (ASTM Condition P) are co-fed into an extruder hopper with 5 to 6 weight percent pellets of a concentrate having 20 percent (active) of crystalline silica. This concentrate is also based in a low-density polyethylenic material which has a melt flow index which is preferably in the same range as is the resin of the polyethylene pellets. The pellet blend is melted in a 32:1 L:D single screw extruder, and is compressed by the screw to a pressure of about 1.25 MPa. Through one injection port (which is located approximately 16 diameter length downstream of the extruder pellet feed throat), carbon dioxide which has been pressurized to 1.75 MPa is regulated through a control valve, for delivery at about 2 to 4 percent of the total extruder flow rate. Through a separate injection port (which is located 90° radially from the port used for carbon dioxide), argon which has been separately pressurized to 1.75 MPa is regulated through a separate control valve, for delivery at about 2 to 4 percent of the total extruder flow rate. Through a third injection port (which is located 270° radially from the port used for carbon dioxide), liquefied polyethylene glycol with an average molecular weight of 8000 ("PEG 8000") and which has been heated to a temperature of at least 65° C. is pumped to a pressure of about 1.7 MPa and is regulated into the extruder at a rate of about 1 to 1.5 percent of the total extruder flow rate.

Immediately downstream from the injection port, the extruder screw is equipped with a mixing section containing at least four screw-diameter lengths of multiple, highly-pitched, segmented flights. The carbon dioxide, argon, and PEG 8000 are mixed into the pressurized melted material in the mixing zone. The molten extrudate is compressed into the final stages of the extruder to a pressure of 14.1 to 14.5 MPa, and, subsequently, is fed through a heated pipe into a secondary extruder.

The secondary extruder is any extruder which has been specifically designed to accept molten polymer feeds. It should have a flighted screw length equivalent to at least 24 of its screw diameters, with equivalence to at least 32 of its screw diameters being the preferred length. The ratio of the screw diameter of the secondary extruder to the screw diameter of the first extruder preferably should be in the 1.25 to 1.4 (ratio) range. The preferred screw design for optimal melt cooling has four parallel flights radially spaced by 90 degrees, with a cross-cut segment having a length of about one-third of the screw diameter missing from each of the four flights and with a repeat length equivalent to four screw diameters.

In the secondary extruder, the extruder barrel temperatures are maintained to deliver a melt temperature in the range of 90° to 115° C. A melt temperature of 108° C. is ideal. The pressure at the head of the extruder should be maintained at 9.3 to 11.3 MPa if an optional gear pump is present, or, if there is no gear pump present, it should be maintained at about 17.5 to 19.5 MPa.

The cooled, pressurized molten mixture of polyethylene, carbon dioxide, argon and PEG 8000 is pumped through a pipe into a hydraulic-pressurized piston chamber which is set to maintain a melt pressure of about 12.4 MPa. The various zones of the chamber are externally cooled by forced convection air to the range of 99° to 105° C.

The specific details of the piston process are disclosed in U.S. Pat. No. 4,323,528 (Collins), the pertinent portions of which are incorporated herein by reference. In summary, as the molten mixture fills the piston chamber, the piston plunger wall moves. When the piston plunger wall moves a predefined distance, a switch actuates both the drive system and the gate system for the cylinder. For the process of the invention, the drive mechanism is set to move the plunger at a predefined speed, so as to eject the molten mixture through the radial die at a rate of about 2350 kg/hour. The ejected molten mixture expands rapidly in all three directions as it leaves the die, but is captured on a conveyor table equipped to move the expanded mass sufficiently both to clear the die and to control the expansion of the material in both the thickness and machine directions. The resulting foam block is left on the table long enough for the next advance of the plunger. Then, the foam block is placed upon additional cooling racks and allowed to cool sufficiently for handling, typically, for 15 minutes.

Example 5 details the preferred embodiment of the invention where the invention is the intermittent process which can produce large cross-section polyethylene foam. Example 6 provides a description of an alternative composition which produces large cross-section foam with tetraethylene glycol dimethyl ether, carbon dioxide, and argon. Example 7 shows the results of when the polyglycol ether is removed from the process under the conditions of Example 6. Example 8 details the intermittent process with polyethylene glycol 8000 and a 50%:50% blend by weight of carbon dioxide and nitrogen.

EXAMPLE 1

This example utilizes both polyethylene glycol having an average molecular weight of 8,000 and carbon dioxide to produce polyethylene foam. Pellets of Westlake Polyethylene 606 are heated in a 48:1 L:D Wilmington 3-inch (76 mm) single-screw extruder which is operating at a screw speed of 30 to 31 rpm. Commercial-grade, 99.8 percent purity carbon dioxide, which has been pressurized, is injected at a pressure of about 13.1 MPa, at a rate of 2.1 kg/hour. Union Carbide Carbowax 8000, which has been heated above 70° C. for liquefaction of the solid and which has been pressurized above 17.2 MPa, is delivered at a rate of about 0.54 kg/hr through a separate injection port (located 180° radially from the port used for carbon dioxide). The three-component mixture is cooled in the extruder to a melt temperature of 107° C., and, subsequently, is pressurized to 15.9 MPa at the extruder discharge. The extruder head pressure is regulated by a Normag 2200 gear pump system, and is delivered through an annular die which is equipped with 3-inch (76 mm) diameter die lips. The die gap is closed sufficiently to generate a die entry pressure of about 9.7 MPa. The extruder output is about 36 kg/hour. The hot foam is drawn over a water-cooled, hollow-tube mandrel, and the outside surface is cooled by forced convection air from a portable, multi-holed ring. The draw rate is controlled by an S-configuration pull roll. The foam sheet is collected subsequently at a downstream winder. Samples of the foam sheet are weighed, and the sheet thickness is measured immediately. Samples taken fresh from the winder have a thickness of 1.35 mm and a density of 64 kg/m$^3$. Two days later, the same samples of foam each have a thickness of 1.52 mm and a density of 59 kg/m$^3$.

EXAMPLE 2

In this variation of Example 1, tetraethylene glycol dimethyl ether (2,5,8,11,14-pentaoxapentadecane), which is commercially available from Ferro Corporation-Grant Chemical Division under the tradename of Tetraglyme, is substituted for the Union Carbide Carbowax 8000, and is delivered at a rate of about 1.8 kg/hour. Pellets of a 10 percent concentrate of American Ingredients Company Pationic 1052 Grade glyceryl monostearate in polyethylene are blended with Westlake polyethylene resin pellets at a 3.6 percent loading. The carbon dioxide rate is reduced to 1.0 kg/hour. The melt temperature is 114° C. Samples taken fresh from the winder have a thickness of 1.35 mm and a density of 104 kg/m$^3$. The samples exhibit thinner caliper within the hour after production, but, the next day, the samples return to the original density.

EXAMPLE 3

This example is similar to Examples 1 and 2, but, additionally, water is added at a rate of 0.22 kg/hour, and a 10 percent concentrate of stearamide is substituted for the glyceryl monostearate with a 14 percent loading in the pellet mix. For this example, the Tetraglyme rate is 1.8 kg/hour, and the carbon dioxide rate is 1.0 kg/hour. The melt temperature is 102° C. In this example, samples taken fresh from the winder each have a thickness of 1.12 mm and a density of 91 kg/m$^3$. The samples exhibit thinner caliper within the hour after production, but, the next day, the sample returns to the original density.

EXAMPLE 4

This example illustrates the results which occur when the supply of Tetraglyme is temporarily depleted during the run exemplified by Example 2. During the trial run of Example 2, the extrusion web breaks, and the problem is quickly traced to an empty canister of Tetraglyme liquid. In the interim, the material coming through the die lips becomes an open cell structure. Gas is randomly exiting the molten mass, and the extruder pressures are fluctuating wildly. When the flow of Tetraglyme is restored, the operating conditions of the extrusion line quickly become stable again, and foam equivalent to that which is made immediately before the process is upset is produced.

EXAMPLE 5

This example utilizes polyethylene glycol having an average molecular weight of 8,000, carbon dioxide and argon to produce large, cross-section polyethylene foam. Pellets of Westlake Polyethylene 606 are mixed with Schulman F20V crystalline talc concentrate based in low density polyethylene, and then, this mixture is heated in a modified 32:1 L:D Berlyn 2.5-inch (63.5 mm) single-screw extruder which is operating at a screw speed of 38 to 42 rpm. Commercial-grade, 99.8 percent purity carbon dioxide, which has been pressurized, is injected at a pressure of about 13.1 MPa and at a rate of 0.91 kg/hour. Commercial grade, 99.998 percent purity argon, which has been pressurized, is also injected through a separate injection port at a rate of 91 kg/hour. Union Carbide Carbowax 8000, which has been heated above 70° C. for liquefaction of the solid and which has been pressurized above 17.2 MPa, is delivered at a rate of about 0.45 kg/hour through a separate injection port (located 90° radially from the port used for carbon dioxide). The five-component mixture, subsequently, is pressurized to 14.3 MPa at the extruder discharge, and, then, is transferred through a heated pipe to a second, larger 3.5-inch (89 mm) single screw cooling extruder. The mixture is cooled in the cooling extruder to a melt temperature of about 107° C., at 4.1 MPa. The secondary extruder head pressure is regulated by a Normag 2200 gear pump system. The melt pump increases the pressure of the melt to 18.3 MPa prior to its delivery into the cooled, hydraulically pressurized piston chamber. When the fill of the material moves the piston to a predefined distance, a switch actuates both the drive system and the gate system so that the cylinder can dispel the material through the radial die at a rate of about 2350 kg/hour. Each of the samples of the resulting foam block has a fresh density of 79.8 kg/m³.

EXAMPLE 6

This example uses tetraethylene glycol dimethyl ether (2,5,8,11,14-pentaoxapentadecane), carbon dioxide and argon to produce large, cross-section polyethylene foam. Pellets of Westlake Polyethylene 606 are mixed with both pellets of a 20 percent active Schulman F20V crystalline silica and about 15 percent by weight of pellets containing 10 percent glyceryl monostearate. The combination is heated in a Colombo RC 18 100-mm twin-screw extruder which operates at a screw speed of 8.25 rpm. Through one injection port, commercial-grade, 99.8 percent purity carbon dioxide, which has been pressurized, is injected at a pressure of about 5.2 MPa and at a rate of 0.45 kg/hour, commercial-grade, 99.998 percent purity argon, which has also been pressurized, is regulated at a rate of 0.5 kg/hour, and Ferro Corporation-Grant Chemical Division Tetraglyme is pumped (into the extruder) at a rate of 0.27 kg/hour. The six-component mixture is cooled in the extruder to a melt temperature of 89° C., and, then, is pressurized to 4.1 MPa at the extruder discharge. The extruder head pressure is regulated by a Normag 2200 gear pump system. The melt pump increases the pressure of the melt to 18.3 MPa prior to its delivery into the cooled, hydraulically pressured piston chamber. When the fill of the material moves the piston to a predefined distance, a switch actuates both the drive system and the gate system so that the cylinder can dispel the material through the radial die at a rate of about 2350 kg/hour. Each of the samples of the resulting foam block has a fresh density of 79.8 kg/m³. Eighty days later, each of the same samples of foam has a density of 83.9 kg/m³.

EXAMPLE 7

This example illustrates the intermittent process results which occur when Tetraglyme is eliminated from the composition, with argon and carbon dioxide. During a repeated trial run of Example 6, the flow of Tetraglyme is deliberately stopped, to confirm that the effect reported in Example 4 for the continuous process is comparable to that which is observed with the intermittent process. Almost immediately as the composition change reaches the extruder discharge, the Normag System 2200 pressure controller exhibits significantly increased variation of the controlled melt pump speed. As the change in composition reaches the die lips, the formation of the polymer foam blocks, which were previously being formed regularly without difficulty, stops, and the blocks become nondescript polymer masses with gas pockets emanating from the die in an erratic manner. When the flow of Tetraglyme is restored, the operating conditions of the extrusion line quickly become stable again, and foam equivalent to that which was made immediately before the process was upset is produced.

EXAMPLE 8

Polyethylene glycol having an average molecular weight of 8,000 and a 50%:50% by weight gas blend of carbon dioxide and nitrogen are used to produce a thick polyethylene foam sheet.

What is claimed is:

1. A foamable composition comprising:

(i) an uncrosslinked low density polyethylene resin having a melt flow index in the range of 1.0 to 3.0 weight percent per 10 minutes (ASTM condition P);

(ii) 0.5 to 2.0 weight percent, based on the weight of the polyethylene (i), of a cell size control agent selected from the group consisting of (i) crystalline silica, (ii) talc and (iii) a stochiometric mixture of citric acid and sodium bicarbonate where the mixture is present at a 1 to 100 percent total concentration in a carrier;

(iii) pressurized argon gas;

(iv) pressurized carbon dioxide gas or pressurized nitrogen gas; and (v) a compatibilizing agent selected from the group consisting of polyethylene glycol having an average molecular weight of 200 to 15,000, tetraethylene glycol dimethyl ether, tripropylene glycol dimethyl ether, diethylene glycol dibutyl ether and poly(ethylene glycol) dimethyl ether.

* * * * *

UNITED STATES PATENT AND TRADEMARK OFFICE
CERTIFICATE OF CORRECTION

PATENT NO. : 5,905,098
DATED : May 18, 1999
INVENTOR(S) : Gary R. Wikes, et. al.

It is certified that error appears in the above-indentified patent and that said Letters Patent is hereby corrected as shown below:

Title page, item [54] and col. 1, line 2, 3 and 4 delete "POLETHYLENIC" and insert --POLYETHYENIC--; delete "POLYGLYOLS" and insert --POLYGLYCOLS--; delete "EHTERS" and insert --ETHERS--.

Signed and Sealed this

Nineteenth Day of October, 1999

Attest:

Q. TODD DICKINSON

*Attesting Officer*    *Acting Commissioner of Patents and Trademarks*